United States Patent
Kwon et al.

(10) Patent No.: US 7,958,321 B2
(45) Date of Patent: Jun. 7, 2011

(54) APPARATUS AND METHOD FOR REDUCING MEMORY ACCESS CONFLICT

(75) Inventors: Young Su Kwon, Daejeon (KR); Bon Tae Koo, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 405 days.

(21) Appl. No.: 12/195,153

(22) Filed: Aug. 20, 2008

(65) Prior Publication Data

US 2009/0150644 A1 Jun. 11, 2009

(30) Foreign Application Priority Data

Dec. 10, 2007 (KR) ........................ 10-2007-0127576

(51) Int. Cl.
*G06F 12/06* (2006.01)
(52) U.S. Cl. ................ 711/150; 711/209; 711/E12.078; 365/63
(58) Field of Classification Search .................. 711/150, 711/209, E12.078; 365/63, 189.05
See application file for complete search history.

(56) References Cited

U.S. PATENT DOCUMENTS

| | | | |
|---|---|---|---|
| 6,507,886 B1 | 1/2003 | Chen et al. | |
| 6,845,423 B2 | 1/2005 | Park | |
| 7,085,890 B2 | 8/2006 | Kashyap | |
| 2003/0185032 A1* | 10/2003 | Zagorianakos et al. | 365/63 |
| 2007/0214302 A1 | 9/2007 | Kubo et al. | |
| 2007/0291553 A1* | 12/2007 | Kim | 365/189.05 |

FOREIGN PATENT DOCUMENTS

KR 10-2006-0113019 A 11/2006
* cited by examiner

*Primary Examiner* — Yong Choe

(57) ABSTRACT

Provided are an apparatus and a method of reducing memory access conflict. An apparatus for reducing memory access conflict when a plurality of data processing elements perform simultaneous access to a memory including a plurality of pages, each of which includes a plurality of subpages, the apparatus comprising: an access arbiter mapping a subpage division address corresponding to least significant bits of a memory access address received from each of the data processing elements to another address having a same number of bits as the subpage division address in order for data to be output from each of the subpages in a corresponding page at a time of the simultaneous access; and a selector, prepared for each of the pages, selecting to output one of the data output from the subpages using the mapped results.

5 Claims, 4 Drawing Sheets

APPARATUS AND METHOD FOR REDUCING MEMORY ACCESS CONFLICT

CROSS-REFERENCE TO RELATED PATENT APPLICATION

This application claims the benefit of Korean Patent Application No. 10-2007-0127576, filed on Dec. 10, 2007, in the Korean Intellectual Property Office, the disclosure of which is incorporated herein in its entirety by reference.

BACKGROUND OF THE INVENTION

1. Field of the Invention

The present invention relates to an apparatus and a method for reducing memory access conflict, and more particularly, to an apparatus and a method for minimizing memory access conflict when a plurality of data processing elements simultaneously access a memory page in a parallel data processing array including a plurality of the data processing elements for processing massive quantity of multimedia data.

This work was partly supported by the IT R&D program of MIC/IITA [2006-S-048-02, Embedded DSP Platform for Audio/Video Signal Processing].

2. Description of the Related Art

Developments in the information technology (IT) have lead to a dramatic increase in the number of multimedia apparatuses processing multimedia data such as audio and video, including not only portable devices but also home appliances. There are various types of multimedia apparatuses available, including digital video disc (DVD) players, multimedia players supporting motion picture experts group 2 (MPEG-2) data compression technologies, cellular phones capable of playing back motion picture, high-definition televisions (HDTV), etc. Video playback and audio playback for the multimedia apparatuses require massive amounts of data. For example, when each pixel of an image of a resolution of 1920 by 1200 is expressed in 24 bit, 1.66 Gbps transmission speed is required to transmit 30 frames per second in a serial bitstream. The more frame rate requires the higher transmission speed. Accordingly most of current video and audio signals employ highly compressing technologies.

There are numerous types of compressing technologies, including MPEG-2, MPEG-4, a H.264, bit sliced arithmetic coding (BSAC), advanced audio coding plus (AAC+), etc. In order to utilize the above-described compressing technologies, a hardware capable of encoding/decoding motion pictures is required. Therefore, most of the present mobile and home multimedia devices include a very large scale integration (VSLI) for a multimedia codec to encode/decode motion pictures in real-time. Although data processing performance required by the codec VLSI depends on complexity or characteristics of a multimedia codec algorithm, recent multimedia codec needs 0.6 giga instructions per second (GIPS) through 1.5 GIPS, and it is anticipated that the required data processing performance will reach 2 GIPS through 5 GIPS within a few years.

A method for implementing the various multimedia codecs into hardware, while obtaining a high performance, is to adopt a processor array structure. While a programmable processor enables the various multimedia codecs to be implemented in a short time, an array structure programmable processor has a potential of a high performance of multimedia data processing. Also, since multimedia data processing has characteristics of repetition of the same operation for a series of data stream, it is easy to make data processed in parallel. Data processing in parallel means that data processing tasks can be independently allocated into a plurality of processors and the allocated tasks can be performed simultaneously.

A processor array for multimedia data processing generally includes a large capacity memory having a structure to which a plurality of data processing elements can simultaneously access. Accesses by more than two data processing elements to the same physical memory may cause a conflict. To resolve the conflict, a memory access arbiter processes memory accesses in turn by sacrificing clock cycles, so that each of the data processing elements can access the memory normally. As the number of data processing elements capable of accessing the same physical memory increases, the number of conflicts also increases continuously, so that overall multimedia data process performances are lowered.

SUMMARY OF THE INVENTION

The present invention provides an apparatus and a method for minimizing memory access conflict when a data processing array including a plurality of data processing elements accesses a main memory, shared by the data processing elements.

According to an aspect of the present invention, there is an apparatus for reducing memory access conflict when a plurality of data processing elements perform simultaneous access to a memory including a plurality of pages, each of which includes a plurality of subpages, the apparatus comprising: an access arbiter mapping a subpage division address corresponding to least significant bits of a memory access address received from each of the data processing elements to another address having a same number of bits as the subpage division address in order for data to be output from each of the subpages in a corresponding page at a time of the simultaneous access; and a selector, prepared for each of the pages, selecting to output one of the data output from the subpages using the mapped results.

According to another aspect of the present invention, there is provided a method of reducing memory access conflict comprising: a plurality of data processing elements accessing simultaneously to a memory including a plurality of pages, each of which includes a plurality of subpages; mapping a subpage division address corresponding to least significant bits of a memory access address received from each of the data processing elements to another address having a same number of bits as the subpage division address to output data from the subpages in a corresponding page at a time of the simultaneous access; and selecting to output one of the data output simultaneously from the subpages in the corresponding page.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
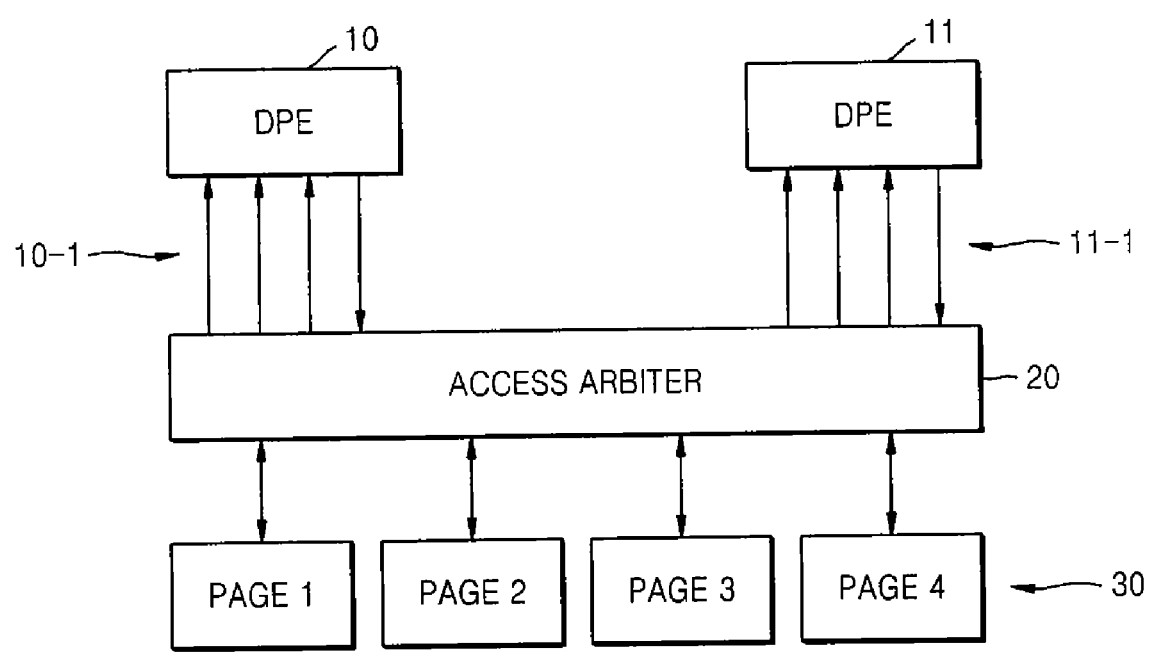
FIG. 1 illustrates a schematic configuration of a parallel data processing array according to an embodiment of the present invention.

FIG. 1 illustrates a schematic configuration of a parallel data processing array according to an embodiment of the present invention.

The parallel data processing array includes a plurality of data processing element(DPE)s 10 and 11, an access arbiter 20, and a memory 30 containing a plurality of pages.

The DPEs 10 and 11 are pipeline structure processors each of which has instructions and a calculation unit for data processing. In a pipeline structure processor, since a plurality of instructions are simultaneously executed to perform tasks at every clock cycle, a plurality of memory accesses are performed simultaneously. Since the DPEs 10 and 11 according to the present embodiment perform a plurality of memory accesses at every clock cycle, independent memory access buses 10-1 and 11-1 are required for each of the memory accesses. Each of the memory access buses 10-1 and 11-1 includes an instruction access bus for reading the instructions, two operand buses, and a result write bus. The memory access buses 10-1 and 11-1 are connected to the access arbiter 20.

The access arbiter 20 analyzes memory access request addresses in a first memory access bus 10-1 of a first DPE 10 and memory access request addresses in a second memory access bus 11-1 of a second DPE 11. Based on an analyzed result, when the memory access request addresses of the first and second DPEs 10 and 11 are conflicted each other, the access arbiter 20 selects one of the memory access address pair causing the conflict, allows the selected memory access address to attempt a memory access at a corresponding clock cycle and causes an access stall to any DPE 10 and 11 requesting the non-selected memory access to access the memory in a next clock cycle.

The memory 30 accessed by the DPEs 10 and 11 is divided into a plurality of physical memory pages in order to minimize the memory access conflict. For example, if a memory address of the DPEs 10 and 11 is of 16 bits, a memory address area is divided into four pages which have addresses 0x0000 to 0x3ffff, 0x40000 to 0x7ffff, 0x8000 to 0xbfff, and 0xc0000 to 0xffffm respectively. By dividing the memory addresses in the above-described way, simultaneous memory access is possible without conflict if the DPEs 10 and 11 access different memory pages.

However, if the same page is accessed simultaneously, conflict still occurs.

Figure 2:
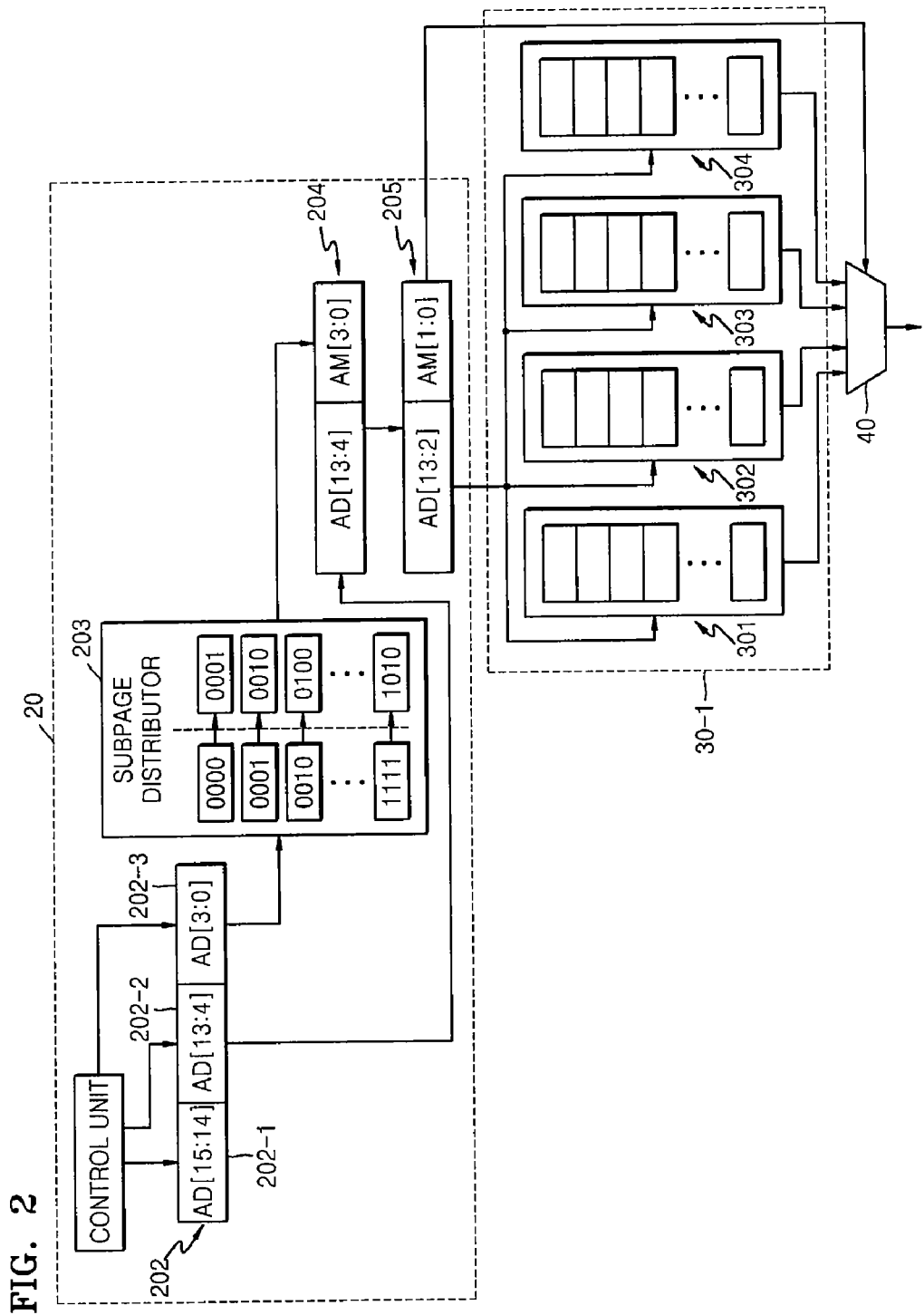
FIG. 2 illustrates a memory reduction apparatus and a memory page structure according to an embodiment of the present invention.

FIG. 2 illustrates a memory reduction apparatus and a memory page structure according to an embodiment of the present invention The memory reduction apparatus includes the access arbiter 20 and a plurality of multiplexers 40 connected to the memory pages.

The access arbiter 20 shown in FIG. 2 includes a control unit 201, a first buffer 202, a subpage distributor 203, and a second buffer.

A memory page 30-1 shown in FIG. 2 includes a plurality of subpages 301, 302, 303, and 304.

The control unit 201 analyzes memory addresses output from the DPEs 10 and 11. Embodiment shown in FIG. 2 is for the memory address size of 16 bits. The control unit 201 divides each of the memory address into a page dividing address 202-1, a subpage address 202-2, and a subpage dividing address 202-3 and stores the divided memory address into the first buffer 202.

The page dividing address 202-1 is 2 most significant bits of the memory address and is used to select one of the four pages of the memory 30 shown in FIG. 1.

The subpage address 202-2 is between the page dividing address 202-1 and the subpage dividing address 202-3 and used to designate a memory address within a subpage. The subpage dividing address is of 4 bits and input to the subpage distributor 203.

The subpage distributor 203 distributes, for example, the subpage dividing address 202-3, which is arranged as a table and input to the subpage distributor 203, to new subpage dividing addresses. Referring to FIG. 2, addresses b0000 and b0001 are distributed to addresses b0001 and b0010, respectively. While the input subpage dividing address 202-3 increase successively, an output subpage dividing address conforms a distribution scheme predetermined by a user. In other words, data can be accessed simultaneously by locating the data causing conflict frequently to different pages. However, 16 output subpage dividing addresses are required to be different from each other.

The output subpage dividing address is concatenated to the subpage address 202-2, and is stored to the second buffer 204 as an output subpage address. The control unit 201 outputs data stored in 2 least significant bits of the second buffer 204 as a selection signal of the multiplexers 40 in order to select an output from the subpages 301, 302, 303, and 304.

12 most significant bits of the output subpage address are output as memory addresses of the subpages 301, 302, 303, and 304.

The subpages 301, 302, 303, and 304 are memories physically divided within the memory page. Each of the subpages 301, 302, 303, and 304 includes one address, an input data port, and an output data port. The multiplexer 40 selects one of data output from each of the subpages 301, 302, 303, and 304, and outputs the selected data. When 2 least significant bits of the second buffer 204 have different values from each other, data can be obtained for each subpage during a single clock cycle. Subsequently, in order to select outputs of different pages from each other according to an identical subpage selection signal, there need multiplexers 40 connected to the subpages 301, 302, 303 and 304 as many as the number of subpages. In the present embodiment, 4 multiplexers are necessary.

An output of the multiplexers 40 is selected by the page dividing address 202-1 and is output as a final page output.

The memory access operation shown in FIGS. 1 and 2 are described below. First, it is supposed that the first DPE 10 and the second DPE 11 operate simultaneously and access the same memory page. It is also supposed that the first DPE 10 accesses 8 data of 0x0010 through 0x0017 while the second DPE 11 accesses 8 data of 0x0014 through 0x001b. Without the subpage distributor 203, the first DPE 10 and the second DPE 11 access the same physical subpage in every clock cycle so that memory stall will occur in every clock cycle. Thus, 16 clock cycles in total will be necessary.

Therefore, conflict can be reduced by using the subpage distributor 203 for re-distributing subpages in which conflict occurs frequently.

Figure 3:
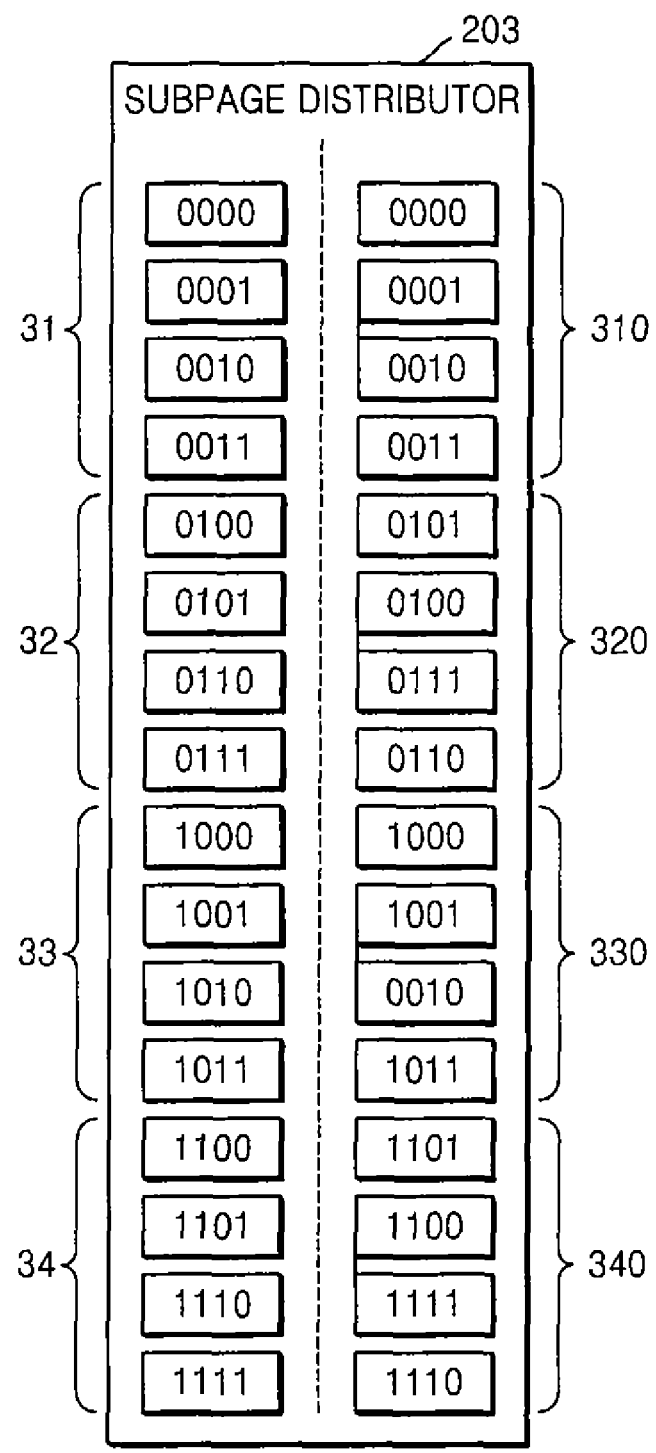
FIG. 3 illustrates a mapping example of subpage dividing addresses by a subpage distributor.

FIG. 3 illustrates a mapping example of the subpage dividing address 202-3 by the subpage distributor 203. Referring to FIG. 3, subpage dividing addresses 0x0000 through 0x0011 31 are mapped to the same addresses 310. Subpage dividing addresses 0x0100 through 0x0111 32 are mapped as such that each two of them are exchanged, namely 0x0101, 0x0100, 0x0111, and 0x0110 320, respectively. Subpage dividing addresses 33 are mapped consecutively as shown in reference number 330, while subpage dividing addresses 34 are mapped as in reference number 340.

Figure 4:
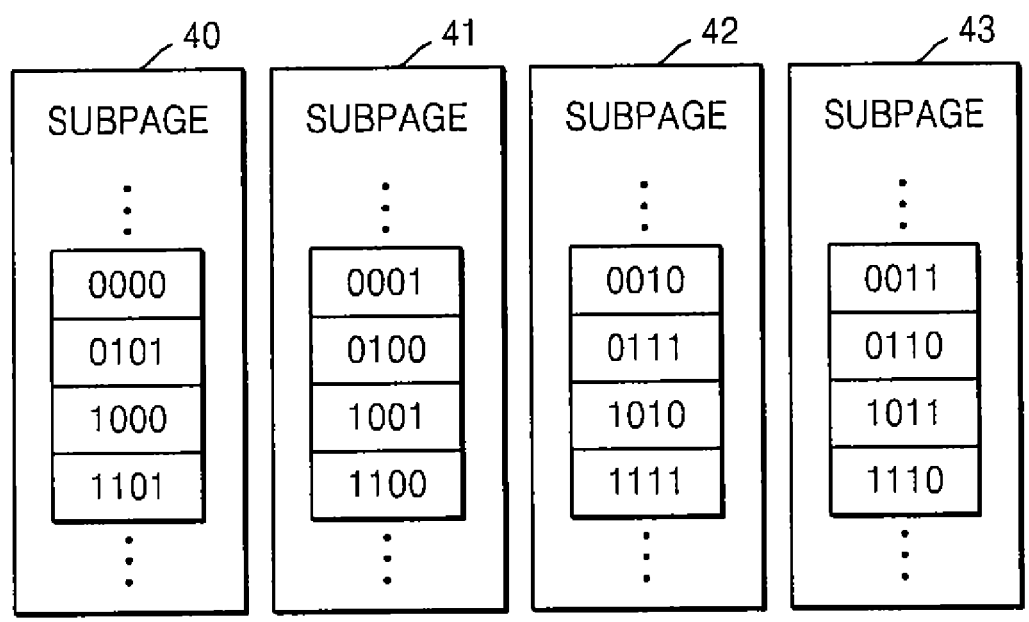
FIG. 4 illustrates data location on a subpage according to a result of the mapping by the subpage distributor as shown in FIG. 3.

FIG. 4 illustrates data locations in the subpage according to a mapping result by the subpage distributor 203, shown in FIG. 3. According to the data arrangement shown in FIG. 4, the first and the second DPE 10 and 11 can access the memory 30 simultaneously without memory stall during the least amount of clock cycles, that is, 8 clock cycles.

According to the present invention, since the memory stall does not occur by dividing a memory into a plurality of pages and further divide each of the pages into a plurality of subpages, a plurality of data processing elements can access the memory simultaneously during the least clock cycles.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for reducing memory access conflict when a plurality of data processing elements perform simultaneous access to a memory including a plurality of pages, each of which includes a plurality of subpages, the apparatus comprising:
   an access arbiter configured to map a subpage division address corresponding to least significant bits of a memory access address received from each of the data processing elements to another address having the same number of bits as that of the subpage division address in order for data to be output from each of the subpages in a corresponding page at a time of the simultaneous access; and
   a selector, prepared for each of the pages, configured to select one of the data output from the subpages using the mapped results,
   wherein the access arbiter classifies the pages using most significant bits of the memory access address and concatenates middle bits of the memory access address and most significant bits of the mapped address to use as a subpage address.

2. The apparatus of claim 1, wherein least significant bits of the concatenated address are used for the selector to select the one of the data output from the subpages.

3. The apparatus of claim 1, wherein the mapping is performed through a programmable table containing pre-programmed page mapping data outputting the mapped address where the subpage division address is input.

4. A method of reducing memory access conflict when a plurality of data processing elements perform simultaneous access to a memory including a plurality of pages, each of which includes a plurality of subpages, the method comprising:
   mapping a subpage division address corresponding to least significant bits of a memory access address received from each of the data processing elements to another address having the same number of bits as that of the subpage division address to output data from the subpages in a corresponding page at a time of the simultaneous access; and
   selecting and outputting one of the data output simultaneously from the subpages in the corresponding page,
   wherein most significant bits of the memory access address are used to classify the pages, and middle bits of the memory access address and most significant bits of the mapped address are concatenated to be used as a subpage address.

5. The method of claim 4, wherein least significant bits of the concatenated address are used to select the one of the data output simultaneously from the subpages in the corresponding page.

* * * * *